May 15, 1951     J. S. CHING, SR     2,553,080
ACCELERATOR AND BRAKE CONTROL
Filed Oct. 26, 1949
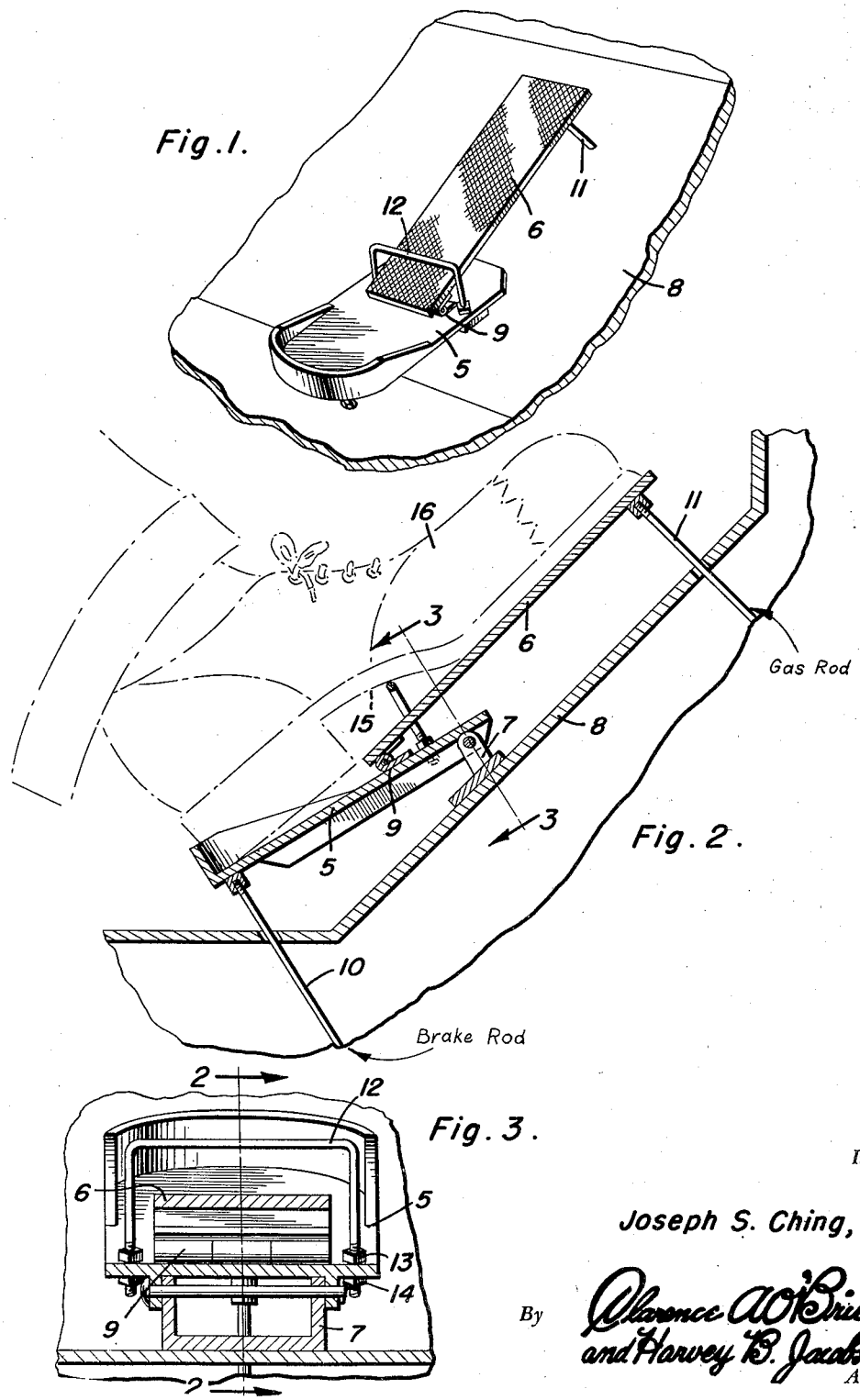
Inventor
Joseph S. Ching, Sr.
By *Clarence A. O'Brien and Harvey B. Jacobson*
Attorneys Patented May 15, 1951

2,553,080

UNITED STATES PATENT OFFICE 2,553,080

ACCELERATOR AND BRAKE CONTROL

Joseph S. Ching, Sr., Honolulu,
Territory of Hawaii

Application October 26, 1949, Serial No. 123,589

2 Claims. (Cl. 192—3)

The present invention relates to new and useful improvements in the accelerator and brake controls of motor vehicles and more particularly to the provision of a novel single pedal mechanism for actuating either the engine throttle or carbureter control and the brake control to eliminate the usual practice of shifting the foot from the accelerator pedal to the brake pedal.

An important object of the invention is to provide a single pedal control for both the accelerator and brake mechanism and whereby a downward pressure by the toe of the driver will actuate the accelerator and a downward pressure at the heel of the driver will apply the brake.

A further object of the invention is to provide an adjustable foot rest for the combined accelerator and brake control pedal.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged longitudinal sectional view and;

Figure 3 is a transverse sectional view taken on a line 3—3 of Figure 2.

Referring now to the drawing in detail wherein for the purpose of illustration I have disclosed a preferred embodiment of the invention the numeral 5 designates the heel portion and the numeral 6 designates the toe portion of a vehicle pedal.

The heel portion 5 is pivoted at its front edge to an upstanding bracket 7 suitably secured to the floor board 8 of a motor vehicle and the rear end of the toe portion 6 overlies the front end of heel portion 5 and is pivoted thereto by means of a conventional type of hinge structure 9 at a point rearwardly of bracket 7.

A brake control rod 10 extends upwardly through floor board 8 and is attached to the rear underside of heel portion 5 for applying the brakes of the vehicle by a downward movement of rod 10 and an accelerator control rod 11 is similarly attached to the underside of the front end of toe portion 6.

An inverted U-shaped foot rest rod 12 is positioned transversely above the rear end of toe portion 6 with the ends of the rods secured in vertically adjusted position to the front portion of heel portion 5 by means of upper and lower nuts 13 and 14 threaded on the end of the foot rest rod and the foot rest 12 is positioned at a point between brackets 7 and hinge 9, as shown in Figure 2 of the drawings.

In the operation of this device the foot rest 12 is positioned under the arch 15 of the foot 16 of the driver of the vehicle to provide for a rocking movement of the foot on the foot rest. Accordingly, a downward pressure of the toe of the foot will depress the toe or accelerator portion 6 while a downward pressure on the heel of the foot will depress the heel or brake portion 5 of the combined accelerator and brake pedal.

The foot rest 12 may be adjusted to support the weight of the foot of the driver without subjecting either the accelerator or brake portion to the weight or pressure of the foot.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A combined accelerator and brake pedal comprising a heel pedal member, means pivotally supporting the heel pedal member adjacent its front end, a control rod connected to the rear lower portion of the heel pedal member, a toe pedal member positioned with its rear end overlying the front end of the heel pedal member, means pivotally connecting the adjacent ends of the heel and toe pedal members to each other, a second control rod connected to the front lower portion of the toe pedal member, and a foot rest supported in a position above said pedal members by one of said members.

2. A combined accelerator and brake pedal comprising a heel pedal member, means pivotally supporting the heel pedal member adjacent its front end, a control rod connected to the rear lower portion of the heel pedal member, a toe pedal member positioned with its rear end overlying the front end of the heel pedal member, means pivotally connecting the adjacent ends of the heel and toe pedal members to each other, a second control rod connected to the front lower portion of the toe pedal member and an inverted U-shaped foot rest secured at its ends in vertically adjusted position to the front portion of said heel pedal member and transversely above the toe pedal member at a point between the respective pivots for said members.

JOSEPH S. CHING, SR.

REFERENCES CITED

The following references are of record in the file of this patent:

UNITED STATES PATENTS

| Number | Name | Date |
|---|---|---|
| 1,152,257 | Young | Aug. 31, 1915 |
| 1,485,612 | Hull | Mar. 4, 1924 |
| 1,550,550 | McCauley | Aug. 18, 1925 |
| 1,630,760 | Powell | June 12, 1934 |
| 2,083,940 | Burton | June 15, 1937 |
| 2,279,458 | Harkness | Apr. 14, 1942 |
| 2,281,755 | Dunning | May 15, 1942 |